United States Patent [19]
Ziolo

[11] Patent Number: 5,858,595
[45] Date of Patent: *Jan. 12, 1999

[54] MAGNETIC TONER AND INK JET COMPOSITIONS

[75] Inventor: Ronald F. Ziolo, Webster, N.Y.

[73] Assignee: Xerox Corporation, Stamford, Conn.

[ * ] Notice: The term of this patent shall not extend beyond the expiration date of Pat. No. 5,322,756.

[21] Appl. No.: 475,511

[22] Filed: Jun. 7, 1995

Related U.S. Application Data

[60] Division of Ser. No. 178,540, Jan. 7, 1994, Pat. No. 5,567,564, which is a continuation-in-part of Ser. No. 910,808, Jul. 9, 1992, Pat. No. 5,322,756, which is a continuation-in-part of Ser. No. 910,803, Jul. 9, 1992, Pat. No. 5,362,417, and Ser. No. 910,805, Jul. 9, 1992, Pat. No. 5,358,659.

[51] Int. Cl.$^6$ .......................... G03G 9/083; G03G 9/107
[52] U.S. Cl. ...................... 430/106.6; 430/115; 430/114; 260/DIG. 38; 106/31.92
[58] Field of Search ................................ 430/114, 106.6, 430/903, 115; 260/DIG. 38; 106/20 D

[56] References Cited

U.S. PATENT DOCUMENTS

| | | |
|---|---|---|
| 2,616,791 | 11/1952 | Roseman et al. . |
| 2,870,000 | 1/1959 | Ryznar . |
| 3,152,046 | 10/1964 | Kapral . |
| 3,654,161 | 4/1972 | Geus . |
| 3,697,265 | 10/1972 | Teuscher et al. . |
| 3,867,299 | 2/1975 | Rohatgi . |
| 3,977,984 | 8/1976 | Roberts . |
| 4,022,701 | 5/1977 | Sawa et al. . |
| 4,122,030 | 10/1978 | Smith et al. . |
| 4,381,338 | 4/1983 | Suzuki . |
| 4,474,866 | 10/1984 | Ziolo . |
| 4,622,281 | 11/1986 | Imai et al. . |
| 4,645,619 | 2/1987 | Badesha et al. . |
| 4,758,275 | 7/1988 | Yubakami et al. . |
| 4,760,009 | 7/1988 | Larson . |
| 4,839,318 | 6/1989 | Kawase et al. .......................... 502/62 |
| 4,855,079 | 8/1989 | Wyman . |
| 4,873,102 | 10/1989 | Chang et al. . |
| 5,047,307 | 9/1991 | Landa et al. . |
| 5,110,624 | 5/1992 | Noble et al. . |
| 5,114,477 | 5/1992 | Mort et al. . |

FOREIGN PATENT DOCUMENTS

| | | |
|---|---|---|
| 0 055 065 | 6/1982 | European Pat. Off. . |
| 3826281 A1 | 2/1990 | Germany . |
| 51-75692 | 6/1976 | Japan . |
| 58-102577 | 6/1983 | Japan . |
| 0 757 573 | 8/1980 | U.S.S.R. . |

*Primary Examiner*—George F. Lesmes
*Assistant Examiner*—Laura Weiner
*Attorney, Agent, or Firm*—Finnegan, Henderson, Farabow Garrett & Dunner

[57] ABSTRACT

Low optical density magnetic fluid which is a stable dispersion of fine magnetic particles. A method of forming the stable dispersion which includes providing an ion exchange resin, loading the ion exchange resin with an ion capable of forming a magnetic phase, treating the loaded resin to form magnetic particles and micronizing the resin and magnetic particles in a fluid to form an aqueous stable colloid. The invention provides submicron particles and submicron particles which are dispersed in an aqueous colloid. A method of forming the stable dispersion which includes providing an ion exchange resin, loading the ion exchange resin with an ion, treating the loaded resin to form nanoscale particles. Fluidizing the resin and particles to form an aqueous stable colloid. A method of forming magnetic materials having tunable magnetic properties and the magnetic materials formed thereby. The magnetic materials contain both single-domain and multidomain particles and have high initial permeability while maintaining coercivity and remanence in the material.

2 Claims, 7 Drawing Sheets

MAGNETIC TONER AND INK JET COMPOSITIONS

CROSS REFERENCES TO RELATED APPLICATION

This is a division of application Ser. No. 08/178,540, filed Jan. 7,1994 now U.S. Pat. No. 5,567,564 which is a continuation-in-part of U.S. patent applications Ser. Nos. 07/910,808, now U.S. Pat. No. 5,322,756; 07/910,803, now U.S. Pat. No. 5,362,417; and 07/910,805, now U.S. Pat. No. 5,358,659 all filed on Jul. 9, 1992, which applications are incorporated herein by reference, in their entirety.

BACKGROUND OF THE INVENTION

1. Fields of the Invention

One aspect of the present invention relates to the formation of a stable colloidal dispersion of fine particles. More particularly, the invention relates to the formation of nanocomposites.

Another aspect of the present invention further relates to the formation of continuous films of submicron particles.

A further aspect of the present invention relates to a ferrofluid having low optical density. Further, the invention relates to a method of preparing the ferrofluid. More particularly, the invention relates to a method of preparing an aqueous ferrofluid. More specifically, the invention relates to a method for the preparation of colored ferrofluids using various colorants, dyes or pigments.

Still another aspect of the present invention relates to the direct preparation of premicronized low optical density magnetic material from submicron ion exchange resin.

A further aspect of the present invention further relates to magnetic materials having tunable magnetic properties, and more specifically, the present invention relates to magnetic materials containing both single-domain and multidomain particles. More particularly, the present invention relates to magnetic materials having high initial permeability while maintaining coercivity and remanence in the pigment.

Another aspect of the present invention relates to a method for making low optical density magnetic fluids containing both single-domain and multidomain particles. More specifically, the invention relates to a method for the preparation of colored magnetic particles and ferrofluids using various colorants, dyes or pigments.

A further aspect of the invention relates to xerographic magnetic liquid toners, colored xerographic magnetic liquid toners and liquid ink compositions and methods of preparation thereof.

Still a further aspect of the invention relates to liquid developers and methods of making the same.

Another aspect of the invention further relates to ink jet applications and more specifically, ink jet inks and methods of making and use the same.

Still another aspect of the invention relates to the preparation of dry particles or fluid materials produced by fluidization and micronization of a material and the subsequent drying thereof to yield dry particles which may be used in a dry state or redispersed in a fluid medium.

Still another aspect of the invention relates to the preparation of materials using resins with a plurality of functional groups to allow precipitation which maintaining binding sites.

Finally, one aspect of the invention relates to the preparation of an MICR composition and a method of making and using that composition.

2. Discussion of the Prior Art

Prior art formation of submicron or nanometer structures have predominantly included the formation of large particles which are subsequently ground or milled until particles of the desired size are achieved. The grinding and milling times associated with the formation of such particles ranged from 120 to 2900 hours.

A method of forming dry magnetic submicron particles by precipitation of a magnetic oxide in an ion exchange resin is discussed and exemplified by Ziolo in U.S. Pat. No. 4,474,866, which is incorporated herein by reference. According to the method employed, an ion exchange resin is loaded with a magnetic ion. The resin is then recovered and dried. The magnetic polymer resin is then micronized to form a fine magnetic powder. The dry magnetic particles formed according to Ziolo, U.S. Pat. No. 4,474,866, like other typical prior art materials, could not be directly suspended in an aqueous medium to form a stable colloid.

Difficulties have been encountered in forming and maintaining nanoscale materials due to the tendency of the particles to aggregate to reduce the energy associated with the high area to volume ratio. This aggregation leads to additional difficulties in the preparation of homogeneous dispersions and thin continuous films produced therefrom.

Prior art formation of films of submicron particles have required the spreading of fine particles which resulted in uneven and noncontinuous films. In addition, if the particles were dispersed in a fluid medium, upon evaporation of the fluid medium, film properties were not continuous but were individual islands of particulate material. By contrast, the fluids of the present material are a composite of a crushed matrix material and nanometer particles in an aqueous vehicle. Upon evaporation of the aqueous vehicle in the present invention, the particles are left in a continuous film joined by a network of this crushed resin material.

More specifically, the preparation of magnetic fluids is, in general, a very time intensive process most simply done by grinding a magnetic material such as magnetite, $Fe_3O_4$, in a suitable liquid vehicle in the presence of a dispersing agent or surfactant to obtain a stable colloidal magnetic fluid. This general preparation is described in detail in Rosensweig & Kaiser "Study of Paramagnetic Liquids," NASA Document N68-14205, Wilmington, Mass. 1967 and IEEE Transactions on Magnetics, Vol. MAG-16, No. 2, March 1980, which is incorporated herein by reference.

In a typical grinding or milling operation to produce magnetic fluids, grinding or milling times of 120–2900 hours (five days to four months) are required. The problem is in producing small enough magnetic particles to enable the formation of a stable colloid. The use of dispersing agents or surfactants is also a problem in that the correct or enabling surfactant must be found empirically. Furthermore, the surfactant may degrade or cause adverse chemical reactions in the magnetic fluid during its application.

In addition, prior art magnetic fluids are typically, by their very nature, black or very dark brown in color and therefore highly absorbent in the visible region of the spectrum. At the heart of such materials are magnetic materials such as iron, cobalt or nickel particles, iron oxide such as $Fe_3O_4$, and the like, generally in an assigned range of about 10–1000 Å. These prior art magnetic fluids are not particularly useful in applications requiring low optical density as they are highly absorbing. Examples of such applications include those requiring high magnetism and low optical density or high optical transmission, particularly in the visible and near infrared region of the spectrum, such as, magneto-optic and electro-optic effects.

Moreover, if a fluid with these magnetic properties is required to be colored, i.e. by mixing it with various colorants, dyes or pigments, the brown, black or muddy appearance of the prior art magnetic fluids produced a colored magnetic fluid which was also brown, black or muddy in appearance. Thus, applications requiring brightly colored fluids that are magnetic, for example, inks and toners were not possible using the prior art magnetic fluids. Moreover, when colorant was added to prior art magnetic fluids, a mixture of dye and magnetic fluid was formed. If a single component colored fluid was required, its formation was not possible using prior art magnetic fluids.

In standard one and two component xerographic and other magnetic imaging systems, the magnetic pigment used has both a remanence and coercivity that enables the pigment to function in the applied field. Due to the remanence and coercivity properties of the magnetic pigment, prior art materials required high weight or volume loading of the pigment in order to get an initial permeability high enough to make the material useful.

Magnetic pigments having high initial permeability are desirable because they allow for substantially lower pigment loadings which in turn improves the rheological properties of a toner or developer or improves the optical properties of, for example, a single component highlight color or color clean machine subsystem.

Prior art superparamagnetic (SPM) materials for use as magnetic pigments provide the desired high initial permeability. These materials are not entirely satisfactory as they have no coercivity or remanence which are necessary for certain applications, i.e. any application requiring a memory. Such superparamagnetic materials have no memory in that, they are only magnetic in the presence of a field and have no net magnetism outside the field.

Ferrofluids which contain superparamagnetic materials as described above, are recognized within the prior art for a number of applications, including exclusion seals for computer disc drives, seals for bearings, for pressure and vacuum sealing devices, for heat transfer and damping fluids in audio speaker devices and in inertia damping. Tyrpical prior art superparamagnetic materials such as those described by Wyman in U.S. Pat. No. 4,855,079, which is incorporated herein by reference, are coated particles which are in an organic based carrier material. More specifically, this patent discloses a superparamagnetic material which is formed by the precipitation of the magnetic particles (magnetite). These particles were subsequently coated with an oleic acid surfactant. The coated particles were eventually suspended in an organic dispersing agent. Again, the use of dispersing agents or surfactants is a problem in that the right or enabling surfactant must be found empirically, and the surfactant may degrade or cause adverse chemical reactions in the magnetic fluid during its application.

A method of forming dry magnetic particles by precipitation of a magnetic oxide in an ion exchange resin is discussed and exemplified by Ziolo in U.S. Pat. No. 4,474,866, which is incorporated herein by reference. According to the method employed, an ion exchange resin is loaded with a magnetic ion. The resin is then recovered and dried. The loaded resin does not contain single-domain and multidomain crystallites internal and external to the resin bead, respectively. The magnetic polymer resin must then be micronized to form a fine magnetic powder. The micronization step is a time and energy intensive process. The dry magnetic particles formed according to Ziolo, U.S. Pat. No. 4,474,866, like other typical prior art materials, could not be directly suspended in an aqueous medium to form a stable colloid.

None of the heretofor known prior art magnetic materials contain both single-domain and multidomain crystallites. Domain as used herein is described for example in C. P. Bean and J. D. Livingston, *J. Appl. Physics* 30, 120s (1959) and B. D. Cullity, *Introduction to Magnetic Materials*, Addison-Wesley Publishing Co., MA, (1972), both of which are incorporated herein by reference.

The presence of both single-domain and multidomain crystallites provides the ability to tune the magnetic properties to match the desired use for the material. By varying the amount of single-domain and multidomain crystallites with respect to one another it is possible to provide a material whereby the properties of high initial permeability, remanence and coercivity may be varied relative to one another.

SUMMARY OF THE INVENTION

It is therefore an object of the invention to overcome these and other difficulties encountered in the prior art.

It is also an object of the present invention to provide a method of forming submicron particles without the use of extended grinding or milling times.

A further object of the present invention is to provide a method of forming an aqueous suspension or colloid of submicron particles.

Another object of the present invention is to provide an aqueous colloid of fine particles capable of forming continuous films of submicron particles.

Another object of the present invention is to provide small or nanoscale particles in a medium or matrix that can be easily crushed or micronized to form a dry powder for dispersion in a fluid or solid, for example a polymer.

It is also an object of the present invention is to provide a fluid magnetic material, preferably a ferrofluid, which has a low optical density in the visible and near infrared wavelength region.

More particularly, an object of the present invention is to provide a stable aqueous dispersion of magnetic material, preferably a ferrofluid, having a low optical density in the visible and infrared wavelength region.

A further object of the present invention is to provide an expedient method of producing the magnetic fluids whereby the magnetic fluids do not require substantial milling or grinding.

Another object of the present invention is to provide a colored magnetic material using various colorants, pigments, dyes or brightly colored metal chelates.

Still another object of the present invention is to provide a method of making colored magnetic materials.

Another object of the present invention is to provide a magnetic material having variable magnetic properties.

Another object of the present invention is to provide magnetic materials containing both single-domain and multidomain particles.

A further object of the present invention is to provide magnetic materials having high initial permeability due to the presence of a superparamagnetic component, while maintaining coercivity and remanence.

Still another object of the present invention is to provide a method for making magnetic materials containing both single-domain and multidomain particles by precipitating the magnetic material into a polymeric matrix.

A further object of the present invention is to provide a low optical density ferrofluid having tunable magnetic properties.

A further object of the present invention is to provide a method of making a colored particle or ferrofluid having tunable magnetic properties using various colorants, pigments, dyes or brightly colored metal chelates.

A further object of the present invention is to provide a liquid developer composition and method of making the same.

Another object of the present invention is to provide a toner composition and method of making the same.

Still another object of the present invention is to provide a composition containing multiple binding sites and a method of making the same.

A further object of the present invention is to provide an MICR composition and methods of making and using the same.

These and other objects have been achieved by the present invention which relates to a process for preparing a stable colloid of fine particles which comprises 1) preparing an ion exchange crosslinked resin matrix; 2) loading the resin matrix with an ion; 3) treating the loaded resin matrix to cause an in-situ precipitation of fine particles; 4) repeating the ion exchange process until the matrix ruptures; and 5) optionally, micronizing the mixture of resin and precipitated particles in a fluid to form the stable colloid of submicron particles where an ion exchange resin of larger than submicron dimensions is used or alternatively, where smaller submicron particles are desired. For the purposes of the present invention, colloid or colloidal material is defined as a stable homogeneous dispersion of particles in a fluid medium.

When using a submicron resin, no micronization step is required to form the stable colloid. A micronization step may however, be used with a submicron resin if smaller submicron particles are desired.

When a micronization step is necessary, the present invention drastically reduces the grinding or milling time to a range of approximately 30 to about 180 minutes. According to the present invention, submicron particles may be produced by building from the molecular level rather than grinding larger particles down to form smaller particles.

Another embodiment of the present invention also relates to a process for preparing a magnetic fluid and the product obtained thereby. The process of preparation comprises 1) providing an ion exchange resin, e.g., a synthetic ion exchange resin; 2) loading or exchanging the resin with ions of iron, nickel, cobalt or ions capable of forming a magnetic phase; 3) treating the loaded resin to cause an in-situ formation of magnetic particles;

4) optionally, repeating the ion exchange process to increase the number and/or size of the particles; and 5) fluidizing the composite containing the resin and nanoscale magnetic particles by micronization to form a stable colloid of the magnetic particles.

The present invention provides a low optical density material thus making capable the coexistence of bright color and high magnetic strength in a single material. The invention drastically reduces magnetic fluid preparation times by two to four orders of magnitude, that is, to about 30–180 minutes. Furthermore, the invention eliminates the need for a dispersing agent or surfactant, which in prior art magnetic fluid preparation has caused uncontrollable foaming, leading to materials loss, instability and performance interference.

Thus, the present invention provides a product and a process of producing the product in which a stable colloid can be formed by fluidizing the composite through micronization of the ion exchange resin and magnetic particles as formed, in the chosen medium, preferably water. Moreover, the fluid formed has a low optical density.

Finally, in another embodiment, the magnetic materials according to the present invention overcome the prior art drawbacks associated with the use of organic dispersing agents, and in addition, achieve coercivity and remanence while maintaining high initial permeability.

These and other objects are accomplished by forming magnetic particles in a submicron ion exchange resin. The method according to the invention allows the particle formation without regrinding. A high quality submicron low optical density material is prepared directly from an ion exchange resin using ultrafiltration technology. The generated material is the first two-component low optical density system observed and comprises single-domain and multi-domain $(\gamma)$-$Fe_2O_3$ crystallites inside and outside of the resin beads, respectively.

These and other objects are accomplished by providing an ion exchange resin matrix, loading the resin with an ion, treating the resin to cause in-situ formation of submicron particles, drying the composite of resin beads and submicron particles and micronizing the composite to form a dry powder.

Additional objects and advantages of the invention will be set forth in part in the description which follows, and in part will be apparent from the description, or may be learned by practice of the invention. The objects and advantages of the invention will be realized and attained by means of the elements and combination particularly pointed out in the appended claims.

DESCRIPTION OF THE PREFERRED EMBODIMENTS

Figure 1:
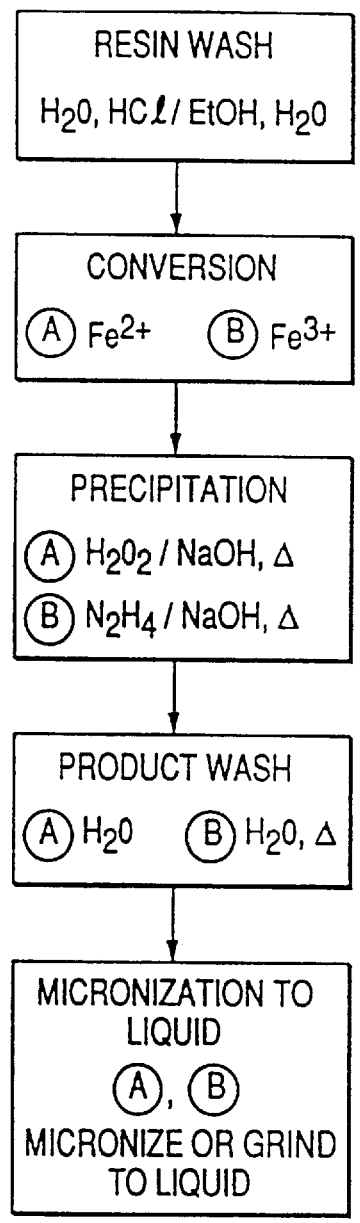
FIG. 1 is a flow chart diagram of the steps for preparation of a low optical density ferrofluid.

In one embodiment according to the invention, nanoscale particles and stable colloids can be prepared using a polymer matrix.

In another embodiment according to the present invention, a composite material comprising an ion exchange resin and magnetic particles is prepared as described in U.S. Pat. No. 4,474,866 to Ziolo which is herein incorporated by reference.

A crosslinked polymer matrix having chemically addressable sites for ion exchange may be used. Such a matrix is provided by an ion exchange resin which may be a synthetic ion exchange resin. The majority of organic ion exchange resins are based upon a matrix of crosslinked polystyrene which provides a chemically and physically robust micro structure of the type needed to produce the fine particulate.

A preferred resin is a polystyrene sulfonic acid (PSSA) ion exchange resin crosslinked from about 1 to 16% with divinylbenzene. More preferably, a 4 to 8% divinylbenzene crosslinked sulfonated polystyrene.

Illustrative examples of suitable ion exchange resins include those polymers possessing chemically addressable sites dispersed throughout their matrix, or on their surface, which sites can be used to either generate an ionic, e.g. magnetic, component in situ or cause the chemical binding of various chromophores to achieve the desired color.

In one embodiment, a plurality of chemically addressable sites are present which allow the precipitation of a nanoscale particle, magnetic or nonmagnetic, while allowing the binding of a group which may be a color as described above, or any other bindable group. In one example, the resin may contain at least two functional groups, one capable of precipitating a particle, while another, for example an amine, allows the binding of a protein or antibody. In this example, a magnetic or nonmagnetic fluid may be tailored for specific medical applications.

Functional groups which may be present alone or in any combination include SO3—, COOH—, etc. and the like. The functional groups which may be used in any combination would be apparent to the skilled artisan.

Specific examples of cationic resins include sulfonated polystyrenes, R—$CH_2SO_3$—$H^+$ strongly acidic phenolics, weakly acidic acrylics, R—COO—$Na^+$ wherein R is an alkyl group, weakly acidic chelating polystyrenes and the like, with strongly acidic sulfonated polystyrenes being preferred. In addition, anionic exchange resins such as Baker IONAC NA-38, Baker IONAC A-554, Dowex® SBR, Amberlite® IRA-400 and Dowex® IX8-100 may also be used. It should be understood by the skilled artisan that one use of anionic resins in the present invention is the conversion of a soluble dye into an insoluble pigment. Other suitable resins can be selected by one having ordinary skill in the art provided that they are colorless or have only slight color density, have a noninterfering color, and providing they achieve the objectives of the present invention.

The resin matrix is preferably capable of withstanding repeated cycles of drying, swelling, and de-swelling and preferably will not decompose thermally below 120° C. The resin is preferably unaffected by exposure to strong acids, bases or redox solutions.

The resin may be of an analytical or an industrial grade. Aside from differences in cost and size, the industrial grade resins have more color than the analytical grades. Most of the color associated with industrial grade resins is temporary and is easily removed by solvent washing, usually with water. After washing, the industrial grade resin retains a weak amber color similar to the analytical grade.

Resin beads may be about 20 to about 500 mesh and are preferably from about 20 to about 400 mesh size or between about 850 to about 38 microns. More preferably, the resin beads are from about 200 to about 400 mesh or between about 75 to 38 microns. The larger size beads have two advantages over the smaller beads. First, the processing time is shorter when using larger beads due to faster settling rates and ease of decanting. Second, the larger beads are mechanically wearer than the smaller beads due to greater osmotic shock effects during their manufacture. Thus, low optical density material prepared from the larger beads crushes and presumably micronizes more easily than those made from the smaller beads. Despite its weaker mechanical strength, the lower cost larger resin retains its ion-exchange capability through and even beyond ten-cycles of loading.

Commercial ion exchange resins for use in the invention include polystyrene sulfonic acid ion exchange resins which may be obtained from such manufacturers as Rohm and Haas and Dow Chemical.

In addition to cost and color, homogeneity of the resin with respect to cross-link density and site sulfonation should be considered in selecting an appropriate resin. These aspects affect the dispersion characteristics of particle size, shape and distribution which in turn alter the optical characteristics of the composite.

Alternatively, the resin may be selected in a submicron size so that no additional micronization step is necessary. Examples of such a matrix include a submicron sulfonated polystyrene resin, designated SSPR for the purposes of the present invention, which is available from Rohm & Haas in emulsion form. Additional submicron resins which would be appropriate for use in the present invention include any submicron resins which do not interfere with the characteristics of the material disclosed herein.

Once a resin is selected, the resin matrix is next loaded with the precipitate precursor ion. In the case of the magnetic colloid this may be several different ions including ferrous or ferric ions, in a manner described in U.S. Pat. NO. 4,474,886 to Ziolo. Examples of the precursor ions which may be used includes those derivable from transition metal ions, such as iron, cobalt, nickel, manganese, vanadium, chromium, rare earths and the like. In the case of a non-magnetic colloid, this may include ions of, for example, sulfur, selenium, gold, barium, cadmium, copper, silver, manganese, molybdenum, zirconium, gallium, arsenic, indium, tin, lead, germanium, dysprosium, uranium, aluminum, platinum, palladium, iridium, rhodium, cobalt, iron, nickel, rhenium, tungsten, lanthanum and the like. These ions generally exist in the form of chlorides of the metal involved, such as ferrous chloride, ferric chloride, copper chloride, nickel chloride, and the like. The corresponding iodides, bromides and fluorides may also be suitable. Other sources of the cation include for example soluble salts such as water soluble iron acetate, nitrate, perchlorate, sulfate, thiocyanate, thiosulfate, nickel acetate, cobalt acetate and the like.

Next, the loaded or exchanged resin is treated so as to cause an in-situ precipitation or formation of the material desired for dipsersion, e.g., the magnetic phase. Magnetic $\gamma$-$Fe_2O_3$ (maghemite), for example, may be precipitated in this manner. Cadmium sulfide a well known semiconductor material, for example, may be precipitated in this manner. Additional particles may include barium sulfate, coppersulfide, manganese oxide, silver chloride, elemental silver, elemental gold and elemental selenium. The nanometer particles may be precipitated as compounds, for example as copper sulfide or in their elemental forms.

Once the composite material has been formed, the ion exchange process and subsequent formation of particles may then be repeated several times to achieve higher loading of particles. This is preferably repeated a plurality of times, more preferably between about 5 and about 10 times or until the ion exchange resin ruptures. In the case of magnetic particles, to increase magnetic strength. As the number of particles increases or their size increases the crosslinked polymer matrix becomes stressed and eventually ruptures. In a typical ion exchange resin, stress may occur after the first loading.

The particles formed are submicron in size, more preferably between about 50 and 150 Angstroms.

Micronization, by, for example, ball-milling of this composite in a stable medium or vehicle, will lead to the formation of the stable dispersion of the composite material in about 30 to about 180 minutes. A suitable vehicle is any vehicle which allows dispersion including for example water and water miscible materials and like solvents, such as methanol, ethanol, glycol and the like. The vehicle may further include any material which will not adversely effect the desired mechanical, electrical or optical properties, for example, water soluble polymers.

Micronization is understood by the skilled artisan to define pulverization of a material to a submicron size in a fluid or dry state. Fluidization as used herein is defined as the formation of a liquid through micronization of the polymeric matrix containing the particles. Micronization may be accomplished by attrition, air attrition followed by dispersion in a fluid, e.g., water, shaking, milling, ball milling, shaking or ball milling directly in water or the like. Shaking or ball milling are preferred. Coarse particles may be removed by filtration or centrifugation. The average micronization time is from about 30 to about 180 minutes.

In one embodiment, a magnetic fluid thus produced may comprise a stable dispersion of $\gamma$-$Fe_2O_3$ about 50 to about 150 Å in size, in water. Because of the small particle size, the bulk optical constants of the usually highly absorbent $\gamma$-$Fe_2O_3$ break down to the point where the optical density is reduced from between about 10 to about 90 of the original values, more preferably from about 25% to about 75%. The optical absorbtion spectrum of such a fluid shows an absorbtion edge of about 570 nanometers in the window from about 600 to at least about 800 nanometers. A typical $\ln(I_O/I)/d$ value (in $cm^{-1}$) for such material at 700 nanometers is about 170. The optical transmission of the fluid according to the invention is improved from 10 to 80% over existing commercial ferrofluids. The magnetic saturation moment at 15 Kilogauss of the ferrofluid formed from the loaded resin begins at less than about one and is preferably from less than about 1 to about 10 emu/g, more preferably from less than bout 1 to about 8 emu/g, depending upon the concentration of the magnetic particles.

When the fluid is contained in a cell or cast into a film (free standing or supported) and placed in a magnetic field, the Faraday rotation effect is realized; (i.e. the material will rotate the plane of plane-polarized visible light to a degree dependent on the applied field strength, the sample thickness and to a lesser extent on the wavelength of light). The fluid itself when examined visually has an unparalleled clarity with a deep red/brown or oxblood hue and lacks the black color of typical known ferrofluids.

With the use of a submicron resin a stable colloid will be formed upon precipitation and no further micronization step will be necessary. An additional micronization step may be carried out if a smaller particle size colloid is desired.

To prepare a premicronized magnetic resin, it is necessary to use a submicron ion exchange resin as the host matrix. Examples of such a matrix include a submicron sulfonated polystyrene resin, designated SSPR for the purposes of the present invention, which is available from Rohm & Haas in emulsion form. Additional submicron resins which would be appropriate for use in the present invention include any submicron resins which do not interfere with the characteristics of the magnetic material disclosed herein.

In the case of submicron resins, the ultrafiltration technique is used in place of conventional ion exchange techniques to process the resin because of the very small size of the resin beads. The submicron resin beads may be suspended in an aqueous colloidal form prior to incorporation of the ions, e.g. magnetic ions, thus resulting in a stable colloidal dispersion of the resin and particles. Alternatively, the resin beads may be removed and dried to form a dry nanocomposite.

In the case of magnetic materials, ions which can be incorporated into the resin beads to form both single-domain and multidomain magnetic particles include: those derivable from transition metal ions, such as iron, cobalt, nickel, manganese, vanadium, chromium, rare earths and the like. These ions generally exist in the form of chlorides of the metal involved such as ferrous chloride, ferric chloride, copper chloride, nickel chloride, and the like. The corresponding iodides, bromides and fluorides may also be suitable. Other sources of the cation include for example soluble salts such as water soluble iron acetate, nitrate, perchlorate, sulfate, thiocyanate, thiosulfate, nickel acetate, cobalt acetate and the like.

Figure 5:
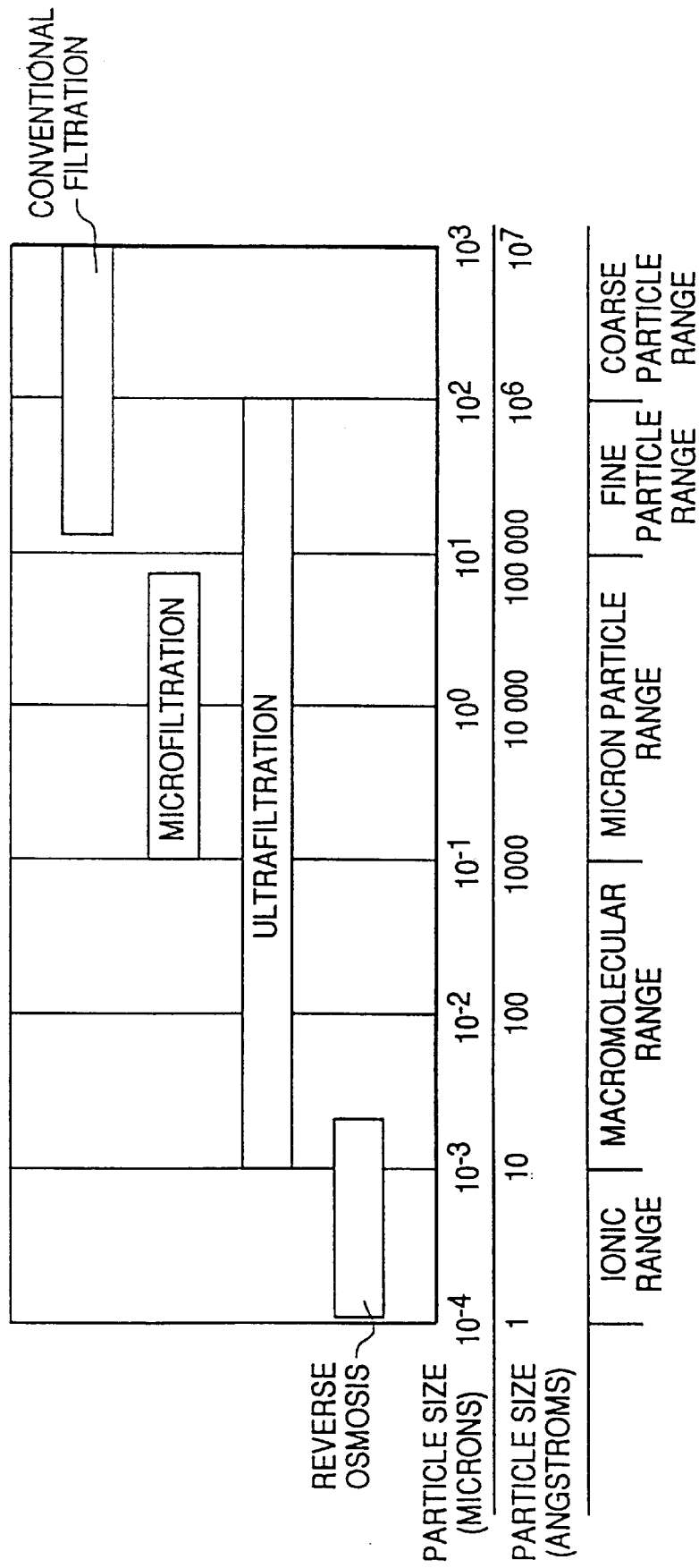
FIG. 5 illustrates membrane separation application based on particle size.

Ultrafiltration is a pressure-activated membrane filtration process capable of performing a variety of selective molecular separations. For a discussion of this technology see Breslau, B.R., "Ultrafiltration, Theory and Practice," paper presented at the 1982 Corn Refiners Association Scientific Conference, Lincolnshire, Ill., Jun. 16–18, 1982, which is incorporated herein by reference. In ultrafiltration, the process fluid flows across a membrane with pore diameters in the range of 10 to 200 Angstroms, as shown in FIG. 1. Solvents and species whose molecular size and weight are below the molecular weight cut-off will permeate through the membrane and emerge as an ultrafiltrate, while rejected species are progressively concentrated in the process stream. Ultrafiltration differs from reverse osmosis in that it employs a more "porous" membrane which will not retain low molecular weight species such as solvent molecules. FIG. 5 illustrates the membrane separation application based on particle size. Ultrafiltration covers the range of $10^{-3}$ to $10^2$ microns.

Figure 3:
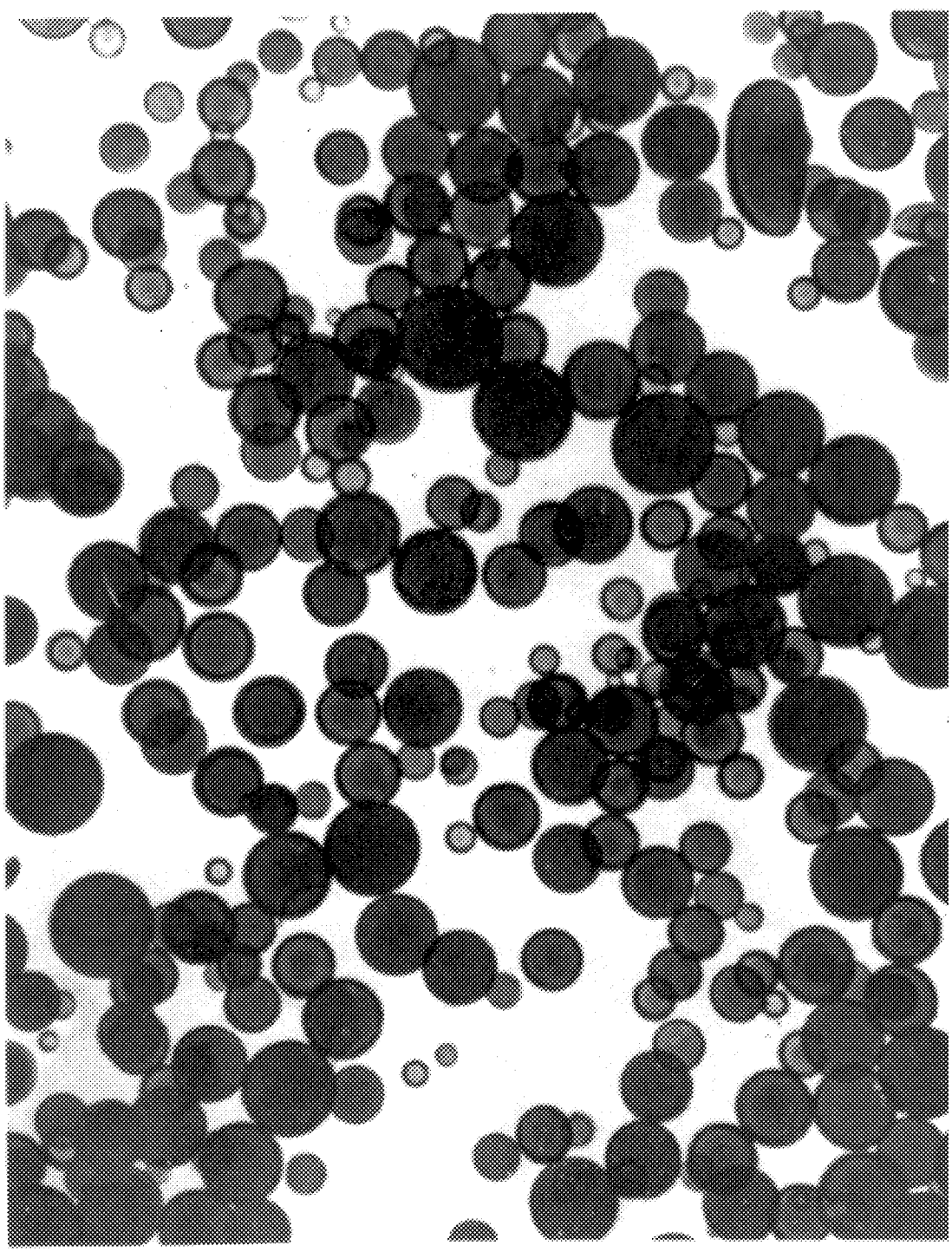
FIG. 3 illustrates a photographic representation of the magnetic low optical density resin beads containing the $Fe_2O_3$ particles.
Figure 4:
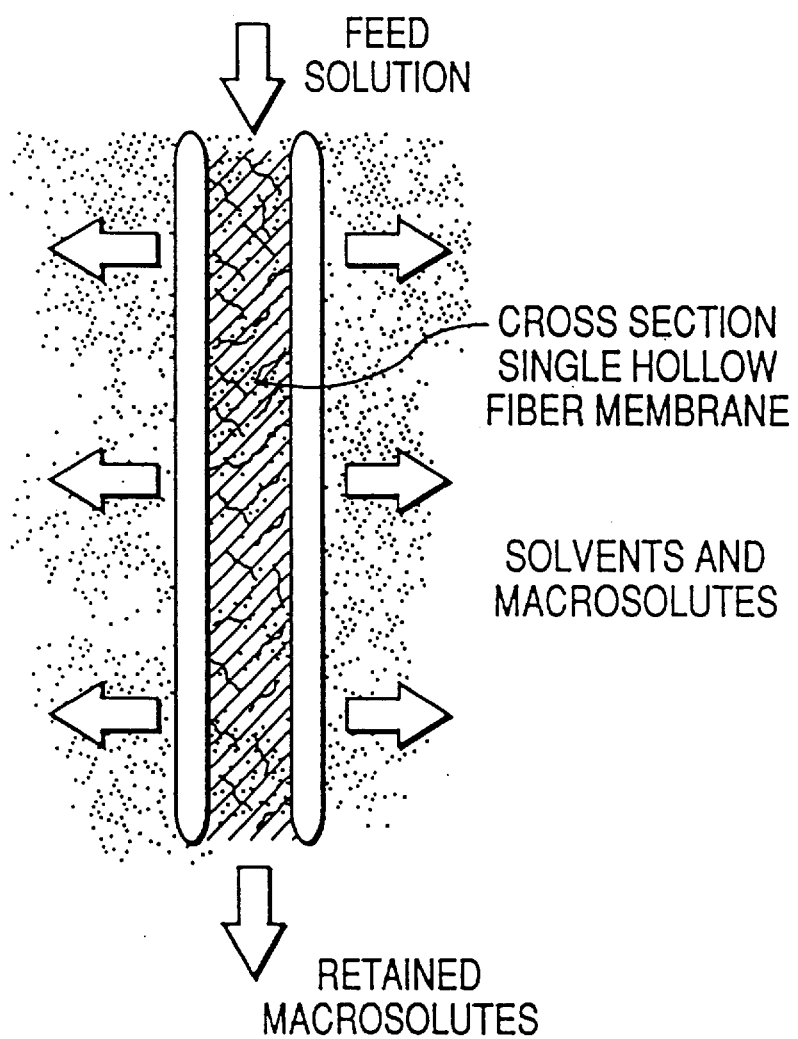
FIG. 4 is an illustration of hollow fiber ultrafiltration.

At the heart of the ROMICON® ultrafiltration system is the hollow fiber shown in the photomicrograph of FIG. 3. These hollow fibers are constructed on non-cellulosic, synthetic polymers. They are anisotropic and have a very tight skin on the internal surface supported by a sponge-like outer structure. The extremely thick wall of the hollow fiber gives it the strength needed for long service. The skin or active membrane is 0.1 microns thick and any species passing through the skin readily passes through the outer structure. Any buildup of foreign matter which occurs, therefore, is solely on the skin and not in the sponge-like outer support.

The self-supporting structure of the hollow fiber enables the use of a backflushing technique to maintain continuous high average flux rates through the fibers. Backflushing forces foreign materials and flux-inhibiting layers from the membrane surface. Because flow occurs on the inside of the hollow fiber under controlled fluid management conditions, high shear forces exist at the membrane surface that minimize concentration polarization by rejected solutes. The rejected solutes are continuously concentrated upstream in the process, while low molecular weight solutes and solvent permeate through the membrane.

The ROMICON® hollow fibers are housed in a cartridge, shell and tube geometry. Shell and tube geometry refers to a construction whereby the fibers are held within an external cartridge, making possible flow through the fibers or flow around the fibers by feeding fluid into the external cartridge, as explained below. Each cartridge contains two process and two permeate ports. The process ports feed directly to the lumen of the fibers, while the permeate port feed directly to the cartridge shell. Flow through these ports can be completely controlled and switched from one mode of operation to another.

The cartridge can be operated at high temperatures due to the non-cellulosic nature of the ROMICON® hollow fiber and in the wide pH range encountered in the preparation of these nanometer particles, more particularly, low optical density materials.

The composite resin beads as described above may be dried prior to micronization and then subsequently micronized to produce a dry powder composite for dispersion in a fluid or solid, for example, a polymer. This dispersion of crushed composite and fluid or solid may subsequently be used in film formation as described below.

In one embodiment, the ion exchange resin is treated with a water soluble metal salt, aqueous base and a mild oxidizing agent to convert it to the magnetic form. The material is then collected by filtration, dried and is ready for use as a magnetic pigment. Micronization of the material is unnecessary since it is submicron before and after the treatment. In addition, the material may be dyed directly through its ion exchange properties for color applications by known technology.

Figure 6:
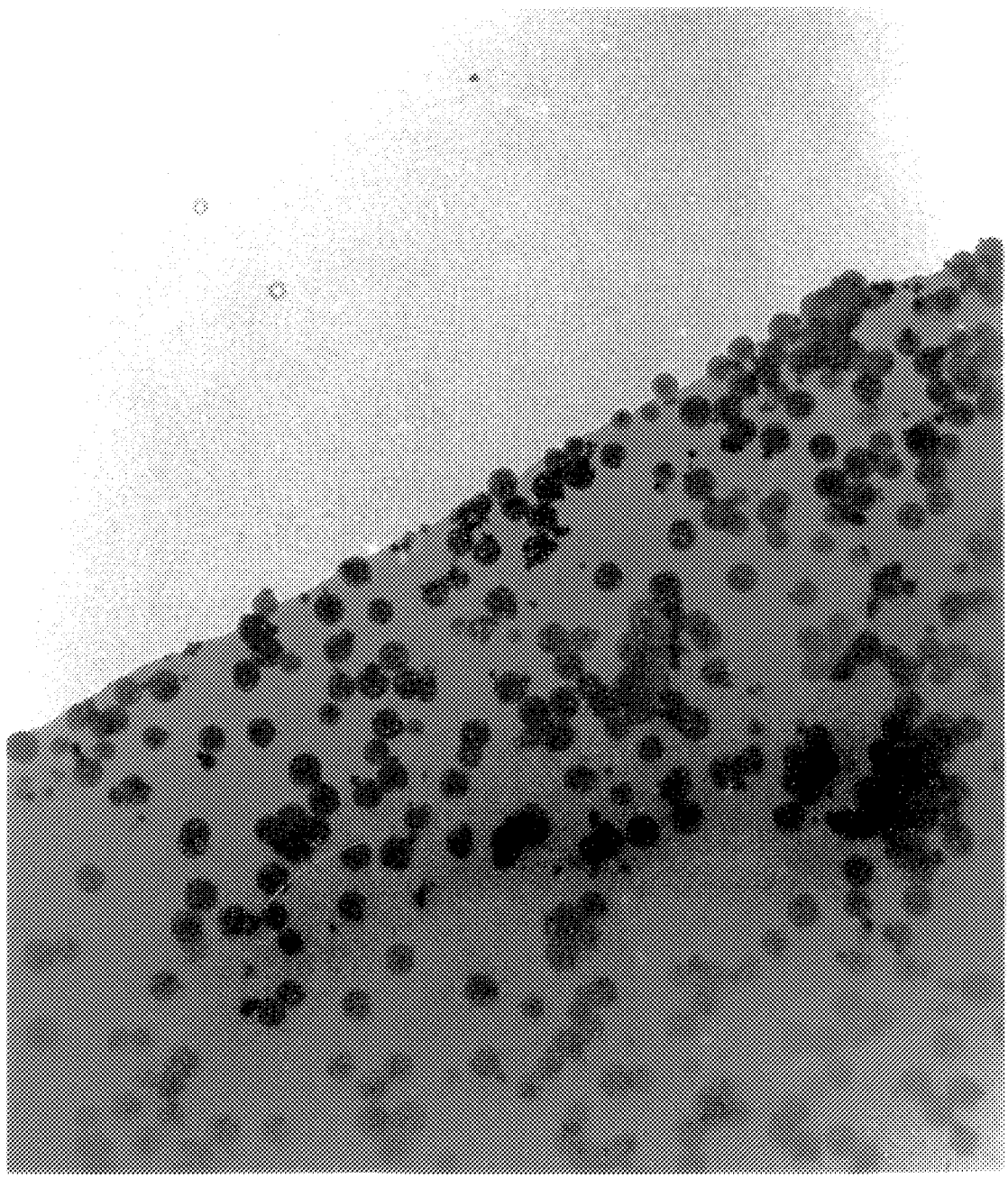
FIG. 6 is a transmission electron micrograph of the SSPR $Fe^{3+}$ resin. Magnification: 50 KX; 1 cm=200 nm.

FIG. 6 shows a magnetic material containing a resin bead having therein single-domain particles, 1, and having thereon multidomain particles, 2. The multidomain particles provide the retentitivity and coercivity component of the magnetic material while the single-domain particles provide high initial permeability.

The high surface to bulk ratio of exchange sites in the resin allows for a distribution of single-domain and multi-domain particles to form in the matrix simultaneously, leading to a magnetic pigment with variable magnetic properties. A range of such distributions is possible such as to allow for a magnetic pigment with high initial permeability, coercivity and remanence.

In another embodiment of the present invention, the particles and resin may be fluidized and then dried to yield a product which has properties differing from the dry materials which have not been micronized. These dry particles may then be used, in for example dry or liquid toners or developers, or they may be redispersed to create another stable colloid. The selection of suitable drying and dispersion cycles and appropriate uses of the intermediate materials is readily recognizable by the skilled artisan.

The materials described herein, e.g. magnetic fluids, may be dyed, may be colored by combination, e.g. mixing with a coloring agent, e.g. food coloring, or may coexist with the colloidal suspension of a second constituent which may be colored pigment. Colored pigment may be added to the mix along with the composite to achieve the desired color. In addition, since ion exchange capability is maintained in the composite itself, color may also be introduced directly in the polymer matrix by ion exchanging dyes or other chromophores into the resin.

There can be selected as pigments, known magenta, cyan, yellow pigments and mixtures thereof, as well as red, green, or blue pigments, or mixtures thereof, and the like.

Illustrative examples of magenta materials that may be used as pigments, include for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4 (octadecyl-sulfonomido) phthalocyanine, X-copper phthalocyanine pigment listed in the Color Index as CI 74160, CI Pigment Blue, and Anthradanthrene Blue X2137, and the like. Illustrative examples of yellow pigments that may be employed include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron yellow SE/GLN, CI dispersed yellow 33, 2,5-dimethoxy-4-sulfonanilide phenylazo-4'-chloro-2, 5-dimethoxy aceto-acetanilide, permanent yellow FGL, and the like.

Illustrative examples of red materials useful as pigments include, cadmium red 150K, CI pigment red 108; lithol red, CI pigment red 49; lithol scarlet, CI pigment red 4301L; toluidene red, CI pigment red 3; and the like. Examples of green pigments include, chrome green, CI pigment green 15; chrome green lake, CI pigment green 18; chrome intra green, CI pigment green 21; phthalocyanine green, CI pigment green 7; and the like. Examples of blue pigments include, phthalocyanine blue, CI pigment blue 15; prussion blue, CI pigment blue 27; ultramarine blue, CI pigment blue 29, and the like.

The color pigments, namely, red, green, blue, cyan, magenta and yellow pigments are generally present in an amount of from about 1 to about 20%, more preferably from about 1 to about 10% and still more preferably from about 2 to about 10%. The pigment is introduced through attrition, air attrition, shaking, milling, ball milling or the like. The pigment particle size is selected so that it will not interfere with any of the desired material characteristics. The particles are preferably submicron in size but may be larger depending upon the intended color application. The ability to manipulate the size of the pigment particle to achieve the desired color result would be with the skill of the practitioner in the art.

Examples of suitable water soluble dyes include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38- A (Reactive Red 4), available from Aldrich Chemical, Drimarene Brilliant Red x-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, INtracron Turquoise HA, and Intracron Black RL, available from Crompton and Knowles, Dyes and Chemicals Division, and the like. Dyes that are invisible to the naked eye but detectable when exposed to radiation outside the visible wavelength range (such as ultraviolet or infrared radiation), such as dansyl-lysine, N-(2-aminoethyl)-4- amino-3,6-disulfo-1,8-dinaphthalimide dipotassium salt, N-(2- aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdi-azinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl) benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl) coumarins, carbostyrils, naphthalimides, 3,7-diaminodibenzothiophen-2,8- disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

The dye is present in the composition in any effective amount, typically from about 1 to about 20% by weight, and preferably from about 2 to about 10% by weight, although the amount can be outside of this range. As will be recognized by the skilled artisan, the above listing of dyes and pigments are not intended to be limiting. Additional dyes and pigments for use in the present invention are readily recognizable by the skilled artisan.

Figure 2:
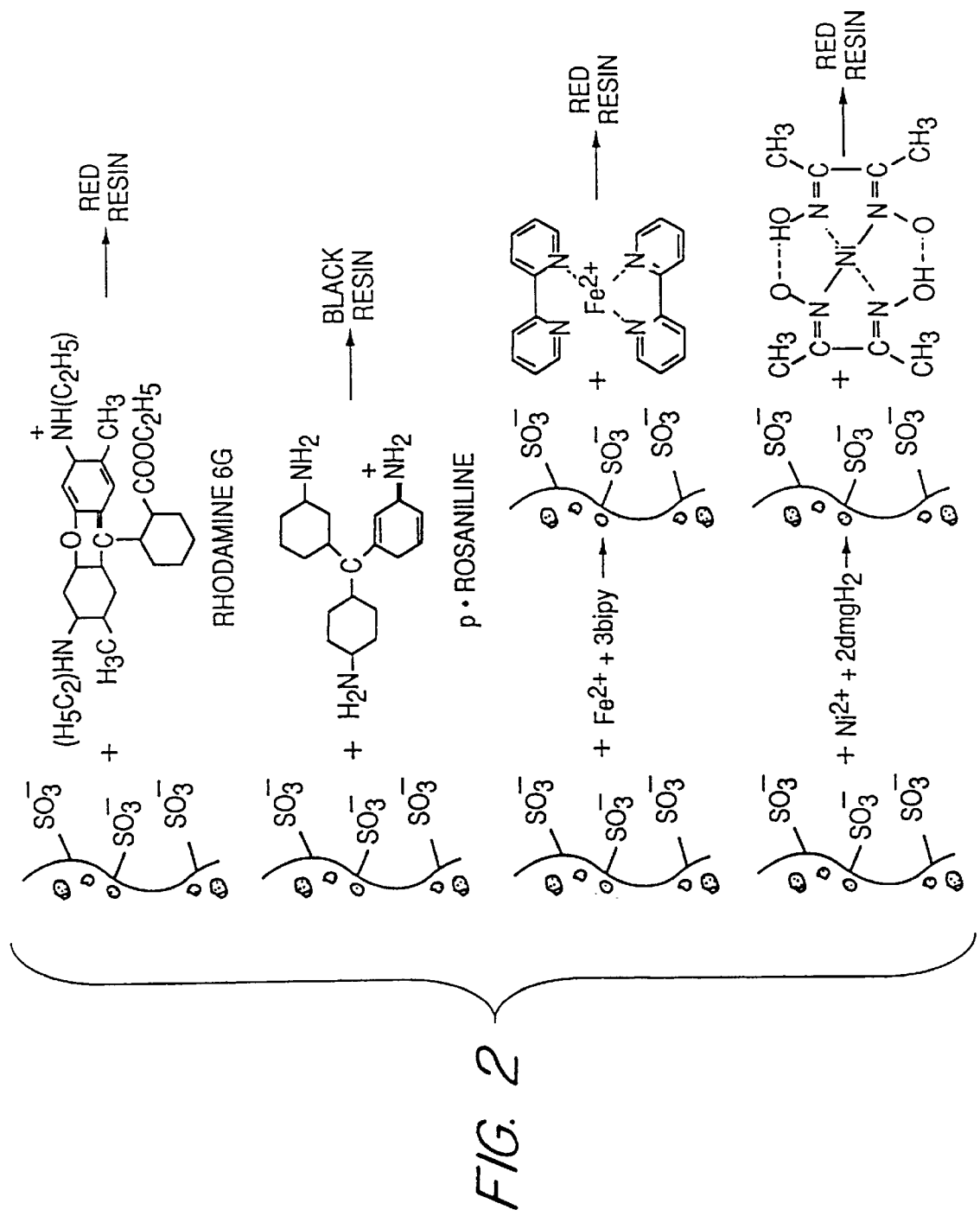
FIG. 2 illustrates direct coloring of the resin matrix.

Since ion exchange capability is maintained in the composite itself, color may also be introduced directly in the polymer matrix by ion exchanging dyes or other chromophores in the resin. Two examples of this approach are illustrated in FIG. 2. The first two direct coloring examples shown in FIG. 2 illustrate ion exchange of cationic dyes to produce red and black resins respectively.

In addition, again using the ion exchange capabilities of the resin, direct coloration can be achieved by the introduction of a metal that can form chromophores with known chelating agents and other chromophore producing materials. The second two direct coloring examples of FIG. 2 illustrate this method of direct precipitation of chromophores in the resin using iron(II) bipyridyl and nickel dimethylglyoxine to form red resins. Direct coloration has been found to be highly efficient and rapid using the micronized form of the composite. Any known dye may be used which is capable of ionic exchange with the resin, as described above. Methods of direct coloration are described in F. Helfferich, "Ion Exchange", McGraw-Hill, N.Y. 1962, and R. Paterson, "An introduction to Ion Exchange", Heyden and Son, Ltd., London, 1970, both of which are incorporated herein by reference.

Colored materials prepared as described above are stable toward settling and do not separate color from the vehicle. More specifically, colored magnetic fluids prepared as described above are stable toward settling and do not separate color from the magnetic vehicle in an applied magnetic field.

The materials as described herein may be used in the formation of continuous films, surface coatings, thick films and free-standing films. Such films may be formed on any known substrate, for example glass, metal, selenium, silicon, quartz, fabric, fibers, paper and the like. Methods of forming these films preferably include evaporation, spin coating, dip coating, extrusion coating, gravure coating, roll coating, cast coating, brush coating, calender coating, meniscus coating, powdered resin coating, spray coating, electrostatic spray coating and by draw bar. Any known method of coating is acceptable. Examples of various coating methods may be found, for example in G. L. Booth, "Coating Equipment and Processes" Lockwood Publishing, New York, 1970; the Kirk-Othmer Encyclopedia of Chemical Technology, 3rd. ed., Wiley-Interscience, New York, 1979; and in "Ullmann's Encyclopedia of Industrial Chemistry," VCH Publishers, New York, 1991. Furthermore, the material of the invention may be mixed or otherwise added to known film forming materials such as polymers, plastics and the like to cast or produce films containing the material of the invention. Films formed from the material of the invention include for example mechanical, magnetic, optical or electronic device applications.

The materials as described herein may also be used in liquid development processes. In polarizable liquid development processes, as disclosed in U.S. Pat. No. 3,084,043 (Gundlach), the disclosure of which is totally incorporated herein by reference, liquid developers having relatively low viscosity and low volatility and relatively high electrical conductivity (relatively low volume resistivity) are deposited on a gravure roller to fill the depressions in the roller surface. Excess developer is removed from the lands between the depressions, and as a receiving surface charged in image configuration passes near the gravure roller, liquid developer is attracted from the depressions onto the receiving surface in image configuration by the charged image. Developers and processes of this type are disclosed in, for example, U.S. Pat. No. 4,047,943, U.S. Pat. No. 4,059,444, U.S. Pat. No. 4,822,710, U.S. Pat. No. 4,804,601, U.S. Pat. No. 4,766,049, Canadian Patent 937,823, Canadian Patent 926,182, Canadian Patent 942,554, British Patent 1,321,286, and British Patent 1,312,844, the disclosures of each of which are totally incorporated herein by reference.

When the liquid developer is intended for use in a polarizable liquid development system, the liquid developer is applied to an applicator such as a gravure roll and brought near an electrostatic latent image. The charged image polarizes the liquid developer in the depressions in the applicator, thereby drawing the developer from the depressions and causing it to flow to the image bearing member to develop the image. For this application, the liquid vehicle of the liquid developer is somewhat more viscous than is the situation with electrophoretic development, since particle migration within the developer is generally not necessary and since the liquid developer must be sufficiently viscous to remain in the depressions in the applicator prior to development. The viscosity, however, remains significantly lower than that typically observed for many printing inks, since the liquid developer must be capable of being pulled from the depressions in the applicator roll by the force exerted by the electrostatic latent image. Thus, liquid developers for use in polar development systems typically have a viscosity of from about 25 to about 500 centipoise at the operating temperature of the copier or printer, and preferably from about 30 to about 300 centipoise at the machine operating temperature. In addition, liquid developers intended for use in polarizable liquid development systems typically have a resistivity lower than liquid developers employed in electrophoretic or photoelectrophoretic development systems to enable the developer to become polarized upon entering proximity with the electrostatic latent image. The liquid developers of the present invention, however, generally have resistivities that are significantly higher than the resistivities of typical printing inks, for which resistivities generally are substantially less than about $10^9$ ohm-cm. Typically, liquid developers for polarizable liquid development systems have a resistivity of from about $10^8$ to about $10^{11}$ ohm-cm, and preferably from about $10^9$ to about $10^{10}$ ohm-cm.

Liquid developers generally comprise a liquid vehicle, a charge control additive, and a colorant. The liquid medium may be any of several hydrocarbon liquids conventionally employed for liquid development processes, such as hydrocarbons, including high purity alkanes having from about 6 to about 14 carbon atoms, such as Norpar® 12, Norpar® 13, and Norpar® 15, available from Exxon Corporation, and including isoparaffinic hydrocarbons such as Isopar® G, H, L, and M, available from Exxon Corporation, Amsco® 460 Solvent, Amsco® OMS, available from American Mineral Spirits Company, Soltrol®, available from Phillips Petroleum Company, Pagasol®, available from Mobil Oil Corporation, Shellsol®, available from Shell Oil Company, and the like. Isoparaffinic hydrocarbons are preferred liquid media, since they are colorless, environmentally safe, and possess a sufficiently high vapor pressure so that a thin film of the liquid evaporates from the contacting surface within seconds at ambient temperatures. Generally, the liquid medium is present in a large amount in the developer composition, and constitutes that percentage by weight of the developer not accounted for by the other components. The liquid medium is usually present in an amount of from about 80 to about 98 percent by weight, although this amount may vary from this range.

The liquid developers of the present invention can also include a charge control agent. Examples of suitable charge control agents for liquid developers include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum resinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive may be present in any effective amount, typically from about 0.001 to about 3 percent by weight, and preferably from about 0.01 to about 0.8 percent by weight of the developer composition, although the amount can be outside this range. Other additives, such as charge adjuvants added to improve charging characteristics of the developer, may be added to the developers of the present invention, provided that the objectives of the present invention are achieved. Charge adjuvants such as stearates, metallic soap additives, polybutylene succinimides, and the like are described in references such as U.S. Pat. No. 4,707,429, U.S. Pat. No. 4,702,984, and U.S. Pat. No. 4,702,985, the disclosures of each of which are totally incorporated herein by reference.

The liquid developers of the present invention contain toner particles or colored toner particles in a liquid vehicle as described above. For example, the toner particles can consist solely of pigment particles dispersed in the liquid vehicle. Since the liquid vehicle is cured to a solid before, or after transfer, the pigment particles can become affixed to the print substrate by the cured liquid vehicle, and no additional polymeric component is required in the developer for fixing purposes. If desired, however, a polymeric component can be present in the developer. The polymer can be soluble in the liquid vehicle, and can include polymers such as poly (2-ethyl hexylmethacrylate); poly(isobutylene-co-isoprenes), such as Kalene 800, available from Hardman Company, N.J.; polyvinyl toluene-based copolymers, including vinyl toluene acrylic copolymers such as Pliolite OMS, Pliolite AC, Pliolite AC-L, Pliolite FSA, Pliolite FSB, Pliolite FSD, Pliolite FSE, Pliolite VT, Pliolite VT-L, Pliolite VTAC, and Pliolite VTAC-L, available from the Goodyear Tire and Rubber Company, Neocryl S-1002 and EX519, available from Polyvinyl Chemistry Industries, Parapol 900, Parapol 1300, and Parapol 2200, available from Exxon Company, and the like; block copolymers such as poly(styrene-b- hydrogenated butadiene), including Kraton G 1701, available from Shell Chemical Company; and the like, as well as mixtures thereof, as disclosed in, for example, copending application U.S. Ser. No. 07/369,003, the disclosure of which is totally incorporated herein by reference. In addition, the polymer can be insoluble in the liquid vehicle, and can be present either as separate particles or as an encapsulating shell around the pigment particles. Examples of suitable polymers in this instance include ethylene-vinyl acetate copolymers such as the Elvax® I resins available from E.I. Du Pont de Nemours & Company, copolymers of ethylene and an -ethylenically unsaturated acid selected from acrylic or methacrylic acid, where the acid moiety is present in an amount of from 0.1 to 20 percent by weight, such as the Nucrel® II resins available from E.I. Du Pont de Nemours & Company, polybutyl terephthalates, ethylene ethyl acrylate copolymers such as those available as Bakelite DPD 6169, DPDA 6182 Natural, and DTDA 9169 Natural from Union Carbide Company, ethylene vinyl acetate resins such as DQDA 6479 Natural 7 and DQDA 6832 Natural 7 available from Union Carbide Company, methacrylate resins such as polybutyl methacrylate, polyethyl methacrylate, and polymethyl methacrylate, available under the trade name Elvacite from E.I. Du Pont de Nemours & Company, and others as disclosed in, for example, British Patent 2,169,416 and U.S. Pat. No. 4,794,651, the disclosures of which are totally incorporated herein by reference. Further, the polymer can be partially soluble in the liquid vehicle, or soluble in the vehicle at elevated temperatures of, for example, over 75° C. and insoluble at ambient temperatures of, for example, from about 10° C. to about 65° C. Examples of suitable polymers in this instance include polyolefins and halogenated polyolefins, such as chlorinated polypropylenes and poly-olefins, including polyhexadecenes, polyoctadecenes, and the like, as disclosed in copending application U.S. Ser. No. 07/300,395, now U.S. Pat. No. 5,030,535 the disclosure of which is totally incorporated herein by reference.

Polymeric components of the solids portion of the developers, when present, are present in any amount up to about 95 percent by weight of the solids component of the liquid developers of the instant invention.

The liquid developers of the present invention can also contain various polymers added to modify the viscosity of the developer or to modify the mechanical properties of the developed or cured image such as adhesion or cohesion. Examples of suitable viscosity controlling agents include thickeners such as alkylated polyvinyl pyrrolidones, such as Ganex V216, available from GAF; polyisobutylenes such as Vistanex, available from Exxon Corporation, Kalene 800, available from Hardman Company, New Jersey, ECA 4600, available from Paramins, Ontario, and the like; Kraton G-1701, a block copolymer of polystyrene-b- hydrogenated butadiene available from Shell Chemical Company, Polypale Ester 10, a glycol rosin ester available from Hercules Powder Company; and other similar thickeners. In addition, additives such as pigments, including silica pigments such as Aerosil 200, Aerosil 300, and the like available from Degussa, Bentone 500, a treated montmorillonite clay available from NL Products, and the like can be included to achieve the desired developer viscosity. Additives are present in any effective amount, typically from about 1 to about 40 percent by weight in the case of thickeners and from about 0.5 to about 5 percent by weight in the case of pigments and other particulate additives.

In addition, liquid developers of the present invention can also contain conductivity enhancing agents. For example, the developers can contain additives such as quaternary ammonium compounds as disclosed in, for example, U.S. Pat. No. 4,059,444, the disclosure of which is totally incorporated herein by reference.

The liquid developers of the present invention generally can be prepared by any method suitable for the type of toner particles selected. For example, the developer can be prepared by heating and mixing the ingredients, followed by grinding the mixture in an attritor until homogeneity of the mixture has been achieved.

Methods of preparing various kinds of liquid developers are disclosed in U.S. Pat. No. 4,476,210, U.S. Pat. No. 4,794,651, U.S. Pat. No. 4,877,698, U.S. Pat. No. 4,880,720, U.S. Pat. No. 4,880,432, and copending applications U.S. Ser. No. 07/369,003 and U.S. Ser. No. 07/300,395, incorporated herein by reference. The charge control agent can be added to the mixture either during mixing of the other ingredients or after the developer has been prepared.

In general, images are developed with the liquid developers of the present invention by generating an electrostatic latent image and contacting the latent image with the liquid developer, thereby causing the image to be developed. When a liquid developer of the present invention suitable for polarizable liquid development processes is employed, the process entails generating an electrostatic latent image on an imaging member, applying the liquid developer to an applicator, and bringing the applicator into sufficient proximity with the latent image to cause the image to attract the developer onto the imaging member, thereby developing the image. Developers and processes of this type are disclosed in, for example, U.S. Pat. No. 4,047,943, U.S. Pat. No. 4,059,444, U.S. Pat. No. 4,822,710, U.S. Pat. No. 4,804,601, U.S. Pat. No. 4,766,049, U.S. Pat. No. 4,686,936, U.S. Pat. No. 4,764,446, Canadian Patent 937,823, Canadian Patent 926,182, Canadian Patent 942,554, British Patent 1,321,286, and British Patent 1,312,844, the disclosures of each of which are totally incorporated herein by reference. Any suitable means can be employed to generate the image. For example, a photosensitive imaging member can be exposed by incident light or by laser to generate a latent image on the member, followed by development of the image and transfer to a substrate such as paper, transparency material, cloth, or the like. In addition, an image can be generated on a dielectric imaging member by electrographic or ionographic processes as disclosed, for example, in U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, U.S. Pat. No. 4,485,982, U.S. Pat. No. 4,731,622, U.S. Pat. No. 3,701,464, and U.S. Pat. No. 4,155,093, the disclosures of each of which are totally incorporated herein by reference, followed by development of the image and, if desired, transfer to a substrate. If necessary, transferred images can be fused to the substrate by any suitable means, such as by heat, pressure, exposure to solvent vapor or to sensitizing radiation such as ultraviolet light or the like as well as combinations thereof. Further, the liquid developers of the present invention can be employed to develop electrographic images wherein an electrostatic image is generated directly onto a substrate by electrographic or ionographic processes and then developed, with no subsequent transfer of the developed image to an additional substrate.

The magnetic nanoscale materials prepared and disclosed in the invention may be incorporated into the liquid development compositions by mixing, and grinding if necessary, or by other known methods of incorporation, as disclosed in U.S. Pat. No. 4,760,009 to Larson. This may be by milling, attrition and the like. The images thus produced after incorporation and imaging are of high resolution with low background and may be magnetic, colored or magnetic and colored.

The materials of the present invention may also be incorporated into toner composition, which comprise the magnetic materials described herein and a compatible vehicle or carrier. The toner compositions into which the materials of the present invention may be incorporated would be readily apparent to the skilled artisan. Toner compositions and methods for making and using the compositions for use with the present invention include, but are not limited to, those disclosed in U.S. Pat. Nos. 5,180,650, U.S. Reissue application No. 33,172 which is a reissue of U.S. Pat. Nos. 4,517,268, 4,256,818, 4,652,508 and 5,102,763, all of which are incorporated herein by reference. The materials of the present invention may be incorporated into toners for use in compositions for developing latent electrostatic images as disclosed in U.S. Pat. No. 5,047,307 to Landa et al., which is incorporated herein by reference. Thus a magnetic-electrostatic toner composition may be prepared.

The materials as described herein may be used in liquid ink compositions, such as in ink jet inks, which comprise generally the magnetic materials as described herein in a compatible vehicle or carrier. The ink compositions, methods of making and methods of using the compositions for use with the materials of the present invention would be readily apparent to the skilled artisan. Compositions and processes which may be used with the materials of the present invention include, but are not limited to, those disclosed in U.S. Pat. Nos. 5,212,496, 5,139,574, 5,072,234, 5,017,644, 5,045,865, 4,970,130, 4,877,451, 5,145,518, 5,172,131, 5,209,998, 5,223,473, 5,232,812, 5,244,714, 5,254,159, 5,256,193, and 5,256,516 which are incorporated herein by reference. The materials of the present invention may also be used in liquid ink composition, such as in ink jet applications, for example, the ink disclosed in U.S. Pat. No. 5,114,477 to Mort et al. which is herein incorporated by reference. Ink jet systems for use with the present invention include thermal, acoustic, electrostatic, magnetic and the like. These systems are readily recognizable to the skilled artisan. In one embodiment, the materials of the invention may be incorporated as described in Examples 6 and 7 below. The images thus produced may be magnetic, colored or magnetic and colored.

The materials for the present invention may also be useful in Magnetic Image Character Recognition (MICR) systems. Unlike conventional MICR systems which require both a write and a read head, when using the materials of the present invention, it is possible to produce characters which require a read head only. In one embodiment of the present invention, a magnetic ink can be printed on, for example, a check, the material not displaying magnetic properties unless subjected to a field. When this material is then subjected to a field, the magnetic image will be apparent and can be recognized by electronic reading equipment.

In one preferred embodiment of the small-particle growth technique, an ion exchange resin is used as the host matrix in which iron oxide is precipitated to form the magnetic composite. The resin consists of an insoluble porous network with attached ionic functional groups and is available in the form of spherical beads with diameters ranging from about one to several hundred microns. The resin is converted from the hydrogen or sodium ion form (exchangeable counterion) to the iron-ion form using water soluble iron (II) or iron (III) chlorides. Treatment of the converted resin with hydrogen peroxide or hydrazine and aqueous base leads to the desired product as illustrated by the following equations wherein R represents the bulk resin as described in U.S. Pat. No. 4,474,866 to Ziolo incorporated herein by reference.

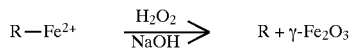

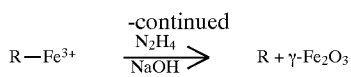

During this process, the ion exchange resin is regenerated in the sodium ion form. The magnetic composite may then be recycled a number of times in the manner described above to achieve the desired level of magnetic loading.

In a typical embodiment the ion exchange resin is treated with water soluble iron salt, aqueous base and a mild oxidizing agent according to the procedures described above to convert it to a magnetic form. The material is then collected by filtration, dried and is ready for use as a composite material comprising resin and iron oxide. In addition, the material may be dyed directly through its ion exchange properties for color application, as described above. The ball milled form of the composite material may be dyed as well.

The magnetic fluids according to the present invention can form the base for the formation of magnetic liquid toners and colored magnetic liquid toners as well as forming the base for a liquid ink composition. A colored magnetic liquid toner may be formed by using as one constituent, a magnetic fluid according to the present invention which has been dyed in the manner described above. The method of forming these inks and toners would be readily apparent to one having ordinary skill in the art.

The following examples are illustrative of the invention embodied herein.

Comparative Example 1

A dry product was prepared by mixing and reacting the appropriate components in a 4 liter glass beaker equipped with a suitable glass cover (190×100 ml Pyrex recrystallizing dish), a 3 inch magnetic stirring bar and a Corning hotplate stirrer. As the ion exchange resin there was selected a sulfonated polystyrene resin commercially available from J.T. Baker Inc., as CGC-241, 200–400 mesh, which resin was used in the form of the sodium salt. During the resin washing and preparation steps, the beaker was filled with water (deionized) and the contents stirred. The composition remained stationary allowing particles to settle and subsequently the mixture was decanted. The preparation sequence that follows relates to obtaining one batch of material wherein the sulfur to iron ratio was 3:1.

In a 4 liter beaker there was charged 1.5 lbs. of the CGC-241 resin, subsequent to removing from the resin, various impurities by washing with de-ionized water until the resulting effluent was clear and nearly colorless. Subsequently, the resin was then washed with hydrochloric acid, 1N, containing 95 percent of ethanol, followed by deionized water washing until the resulting effluent was colorless and has a neutral pH. A final washing was accomplished in aqueous sodium hydroxide, 1N, followed again by a deionized water washing until the resulting mixture had a neutral pH.

The CGC-241 resin obtained subsequent to the washings was now treated with a ferric chloride solution prepared by adding 2 lbs. of $Fe_3Cl_3.6H_2O$ to one liter of water and filtering rapidly through a 32 centimeter Whatman folded paper No. 2V. The iron solution was added directly to the purified resin simultaneously with a sufficient amount of water in order to completely substantially fill the beaker.

The resulting suspension was then stirred for 2 hours after which the solution was decanted and the resulting resin was washed with deionized water which washings were continued until no ferric ion remained in the effluent as determined by the absence of a deep red color when treated with a slightly acidic aqueous solution of potassium cyanide. The deep red color results from the formation of several thiocyanto complexes of iron with a valence of 3.

The resin was then suspended in a full beaker, 3.8 liters of water, stirred and heated to 60° C. on a hotplate stirred in a ventilated hood. Hydrazide, 100 milliliters, 95 percent purity, available from Eastman Kodak company as Eastman 902, was then added dropwise to the suspension over a period of an hour while the temperature was maintained at 60° C. During this period, the suspension was converted from a brown color to black and $NH_3$ was emitted. When the addition of hydrazine was complete, 100 milliliter of water containing 80 grams of sodium hydroxide was added directly to the resin suspension, followed by heating and stirring for about 24 hours. Subsequently, the solution was decanted and the resin washed with deionized water until a neutral pH was obtained.

The resin was then recovered in a 2 liter glass fritted filter and placed in a drying oven, at a temperature of 120° C. for about 16 hours. During this period, the black resin changes color to an amber red and the resulting beads which now contain iron oxide are optically transparent and have a lusterous appearance.

A fine powder of magnetic polymer resin was obtained by micronizing the 200 to 400 mesh polymer beads by milling. With the resin containing about 5 meq/gram total exchange capacity on the dry basis, the weight percent loading of iron oxide, $Fe_2O_3$, is about 12. At room temperature, the iron oxide containing polymer had a magnetic strength of about 9 emu/grams and was superparamagnetic as evidenced by the absence of any hysteresis in the magnetization curve.

Example 2

A 2 ml volume of three-cycled iron (III) ($Fe^{3+}$) resin, prepared according to the process described in Example 1, was added to 24 mls of deionized water and 285 grams of ⅛" steel shot (316) in a 4 oz. amber glass bottle. This mixture was then shaken vigorously on an industrial paint shaker for about 4 hours. The resulting liquid was then decanted from the steel shot, collected and centrifuged for about 2 hours at 7500 rpm. The resulting clear liquid was decanted and allowed to evaporate to about 5 mls, total volume, to produce a clear, reddish-brown liquid that is strongly magnetic and stable. The formed colloid shows a zeta potential of about −40 millivolts.

Example 3

About 25 grams of 10 cycled iron (II) ($Fe^{2+}$) resin produced by the process described in Example 1, was ball-milled in an 8 oz. glass jar containing 100 mls of water and 500 grams of ¼" steel shot (316) at about 90 ft/min for about 40 mins. The resulting fluid was decanted and centrifuged for 3 hours at 7500 rpm. The resulting clear liquid was decanted and allowed to evaporate to about 10 to 20 mls, total volume, to form a clear oxblood red liquid having a magnetic saturation moment of about 8 emu/g.

Example 4

Iron (III) ($Fe^{3+}$) loaded ionic exchange resin prepared as described in Example 1, was treated with a 0.8 molar aqueous solution of nickel chloride in order to affix $Ni^{2+}$ to the cationic exchange sites on the resin. After rinsing several times with 100 ml portions of deionized water to remove excess physisorbed $Ni^{2+}$, the resin was rinsed with an alcoholic solution of 10% dimethylglyoxine (DMG) wherein the resin turned bright red in color. Excess DMG was then removed from the resin by ethanol and ethanol/water rinses until no DMG appeared in the rinse solution. The bright red, magnetic resin (2 ml volume) was then treated as described in Example 3, to produce a brightly colored red magnetic liquid having a magnetic saturation moment of about 8 emu/g.

Example 5

A 4 ml volume of three-cycled iron (III) ($Fe^{3+}$) resin, prepared as described in Example 1, was added to 60 mls of deionized water and 600 grams of ⅛", steel shot (316) in an 8 oz. amber glass bottle. The mixture was shaken in a Red-Devil paint shaker for 5 hours, decanted and centrifuged for 2 hours at 7500 rpm. The liquid was then allowed to evaporate slowly to about 6 mls, total volume, to form a stable, transparent, magnetic fluid. This fluid was then poured onto a 5"×5" glass plate to effect uniform coverage and allowed to evaporate to dryness. The film formed thereby was magnetic and transparent to ordinary room light. The film displayed the well-known Faraday rotation effect in that the film, when in the presence of a magnetic field, in this case, 2000 Gauss, rotated the plane of the plane-polarized light.

Example 6

An ink composition comprising 2.5 percent by weight of the magnetic material produced in Example 2, 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), and 81.5 percent by weight of toluene was prepared by mixing together the ingredients at room temperature, 25° C., stirring to obtain a homogeneous solution, and filtering. The ink thus prepared can be incorporated into a thermal ink jet test fixture. It is believed that images of excellent resolution with no substantial background deposits can be obtained. The images thus produced are magnetic and may be colored by incorporating dyes or pigments as described in the above specification and FIG. 2.

Two additional inks can be prepared, said inks being of the same composition as above, except that one contained 0.1 percent by weight of CARBOWAX M20™ (a polyethylene oxide/bisphenol-A polymer with a molecular weight of 18,000 (obtained from Union Carbide Corporation, Danbury, Conn.)), and 2.4 percent by weight of the fullerene, and the second ink contained 0.3 percent by weight of CARBOWAX M20™ and 2.2 percent by weight of the fullerene. The CARBOWAX M20™ is added to the ink at room temperature and the resulting mixture is stirred for about 5 minutes to obtain a homogeneous solution.

Example 7

An ink composition comprising 2.5 percent by weight of the magnetic material of Example 2, 15 percent by weight of ethylene glycol, 0.3 percent by weight of CARBOWAX M20™, and 82.2 percent by weight of water was prepared by mixing together the ingredients at room temperature, stirring for about 10 minutes to obtain a homogeneous solution, and filtering. The ink thus prepared was incorporated into a jetting test fixture. It is believed that images of excellent resolution with no substantial background deposits can be obtained. The images thus produced are magnetic and may be colored by incorporating dyes or pigments as described in the above specification and FIG. 2.

Example 8

60 g of Dowex® 50X8-400 ion exchange resin, obtained from the Aldrich Chemical Co. (Milwaukee, Wis.), were washed clean in batch with concentrated HCl, followed by washings with 0.1N NaOH, deionized water, methanol and finally deionized water.

38 g of $BaCl_2$ in 350 ml of $H_2O$ was then added to the washed resin and the mixture stirred for 2 hours. The mixture was filtered and the procedure repeated with another batch of $BaCl_2$ solution. The mixture was then filtered and the resin washed with deionized water, first through a filter and then in batch until the filtrate tested negative for barium ions using a sulfate test for barium. The resin was then filtered and a solution of 60 g of $Na_2SO_4$ in 400 mls of $H_2O$ was added. The mixture was stirred for 1.5 hours. The resin was filtered and washed clean with large amounts of deionized water then dried overnight at 110° C. to form a composite of ultra-fine particles of $BaSO_4$ in the ion exchange resin. Transmission electron microscopy revealed barium sulfate particulate about 5 to 15 nm in size suspended in the resin. Elemental analysis for barium showed the expected barium to sulfur (sulfonate) ratio of one half.

Example 9

An ultra-fine particle dispersion of copper sulfide in a polymer resin matrix was formed by treating Dowex® 50X8-400 ion exchange resin from the Dow Chemical Co. (Midland, Mich.) with solutions of copper nitrate and soluble sulfide.

60 g of Dowex® 50X8-400 was washed as described in Example I, above and placed in a 500 ml beaker equipped with magnetic stirrer and stirring bar. Next, 350 ml of water containing 90 g of $Cu(NO_3)_2.6H_2O$ was added to the beaker and the contents stirred for one hour. The resin was then filtered and the procedure repeated a second time. The resin was then thoroughly washed with deionized water until no free copper ions were found in solution. The resin was filtered using a coarse glass frit funnel and resuspended in a solution containing 85 g of $Na_2S.9H_2O$ in about 400 ml of water and stirred for about one hour at room temperature. The resulting dark colored resin was then filtered and again washed with large amounts of deionized water until it was free of excess soluble sulfide. Electron microscopy of the microtomed resin revealed CuS particles less than 20 nm dispersed throughout the resin. Elemental analysis for copper showed the expected copper sulfide to sulfonate sulfur ratio of about one half.

Example 10

A nanocomposite of the well-known semiconductor, cadmium sulfide, CdS, was prepared by following the procedure of Example II, except that 80 g of $Cd(NO_3)_2$ were used in place of the copper nitrate. The cadmium sulfide was then precipitated in the ion exchange resin and processed as described in Example II. In a separate experiment, the CdS was precipitated using a solution of 25 g of ammonium sulfide, $(NH_4)_2S$, in 300 g of water. The yellow/orange composite was then filtered and thoroughly rinsed with deionized water to remove soluble sulfide. The resin was then dried at 110° C. overnight. The cadmium sulfide particles in the resin ranged in size from about 0.1 to greater than 20 nm depending on processing conditions.

Example 11

60 g of Amberlite® IRP-69 ion exchange resin manufactured by Rohm and Haas Co. (Philadelphia, Pa.) was washed as described in Example I and placed in a 500 ml beaker equipped with magnetic stirrer and stirring bar. The resin was then treated with a solution containing 40 g of manganese chloride in 350 ml of water and stirred for 2 hours. The resin was filtered, and the procedure repeated a second time. The resin was then filtered and rinsed thoroughly with large amounts of deionized water. The resin was then suspended in 300 ml of deionized water in a 500 ml beaker. 6 g of NaOH in 25 ml of deionized water was added to the beaker with stirring to bring the pHl to near 14. The suspension was then treated with 10 ml of 30% $H_2O_2$ diluted to 60 ml with deionized water in a dropwise fashion over a period of 30 minutes with continued stirring. The resin was then washed to neutral pH, filtered and dried overnight at 110° C. to afford a composite of ultra-fine particle $MnO_2$ in polymer. The $MnO_2$ particle sizes in the resin ranged from about 0.2 to 20 nm as determined by transmission electron microscopy of microtomed samples of the composite.

Example 12

60 g of washed Dowext ® 50X8-400 ion exchange resin were stirred for one hour in a solution containing 60 g of silver nitrate in 400 ml of deionized water. The resin was then filtered and treated a second time with the silver nitrate solution. The resin was then washed with large amounts of deionized water to remove all traces of free silver ion. Next, the resin was stirred in a sodium chloride solution of 50 g of NaCl in 400 ml of deionized water for one hour. The resin was then filtered and dried overnight in a vacuum desiccator to form a nanocomposite of silver chloride in polymer resin. Transmission electron microscopy and X-ray diffraction indicated silver chloride in a particle size less than 20 nm.

Example 13

Iron (III) -SSPR $Fe^{3+}$

Three hundred and seventy five grams of $FeCl_3.6H_2O$ were dissolved in 1.5 liters of deionized water and added to 1 liter of SSPR resin diluted to 2.5 liters. The suspension was stirred for 1 hour then diluted to 5 liters and added to the holding tank of the LAB-5 system. The ROMICON™ Modeal HF-LAB-5 is a single cartridge hollow fiber ultra-filtration system for the concentration or separation of laboratory and industrial fluid streams.

Diafiltration was begun to wash the suspension free of excess iron and hydrogen chlorides. Approximately 60 liters of tap water were used for the wash which took approximately 2 hours. After the wash, the suspension was recovered as a 5 liter sample and appeared dark tan in color indicating that exchange had taken place.

After a successful test run on 30 mls of sample, the full 5 liter sample was divided equally among two 4 liter beakers and heated to 80° C. 25 g of NaOH dissolved in 120 mls of deionized water were added to each beaker along with 27 mls of 95% $N_2H_4$ Stirring and heating were continued for 1 hour during which time the suspension changed from tan to black with bubbling. The contents of each beaker was diluted to 3.5 liters with tap water whereupon the pH changed from 13 to 12. The suspension was placed in the LAB-5 system and washed for 1 hour to neutral pH with 50 liters of tap water. The suspension was concentrated to 4.5 liters and drained from the LAB-5 system. Most of the resin remained in suspension although some settling was observed. A small amount of the resin was obtained by centrifuging a 400 ml sample followed by decanting and was used for testing after drying at 100° C. overnight. Centrifugation of the resin is feasible after the first loading due to the increased density of the resin.

During diafiltration, the LAB-5 system was operated with 25 psi at the inlet port and 5 to 7 psi at the outlet to maintain a pressure differential across the membrane of about 20 psi. The inlet and outlet pressure and the permeate volume were measured as a function of time during the processing as a check on the flux rate of the membrane which was found, to be about 76 gal/sq. ft./ day. After use, the apparatus was rinsed with 0.5% NaOH using the standard cleaning procedure as described at pages 11–15 of "ROMICON™ Model HF-LAB-5 Ultrafiltreation System with Reverse Flow," Operating Instruction Manual, Romicon, Inc., Woburn, MA 01801.

The SSPR $Fe^{3+}$ (low optical density magnetic material loaded with an $Fe^{+3}$ ion) dries to a black glossy mass which is easily crushed to smaller agglomerates composed of the submicron resin beads. Examination of the sample at 70× shows a good optical quality low optical density material which is reddish in color by transmitted light and which resembles the large-bead $Fe^{2+}$ (low optical density magnetic material loaded with an $Fe^{+2}$ ion) material more than it resembles the large-bead $Fe^{3+}$ material.

The SSPR $Fe^{3+}$ sample is two-component as shown in the electron micrograph in FIG. 5. The first component consists of individual submicron particles of resin beads (1) with diameters the same as those measured by SEM analysis before loading the sample. The second component consists of individual crystallites (2) ranging in size from 75 to 250 Angstroms. The latter appear identical to the $(\gamma)$—$Fe_2O_3$ particles dispersed in the large-bead $Fe^{2+}$ material.

A TEM analysis of the resin beads at 200 KX showed a dispersion of crystalline particles less than 50 Å in diameter. Resolution of the particles internal to the beads was obtained at 660KX using a Phillips EM400T electron microscope. A TEM photograph of four beads is shown in FIG. 6. The internal crystallites are approximately 15 Å in diameter and are dispersed relatively uniformly throughout the resin.

Energy dispersive X-ray analysis (EDAX) of the sample shows that both components contain iron. The X-ray diffractogram of the sample is consistent with that of $(\gamma)$—$Fe_2O_3$. Analysis of the resin after conversion to the gamma form gave 8.3% iron, indicating that no loss or iron occurred during conversion. This figure is close to the 5.1 meq/dry g nominal capacity of the resin, where 8.7% iron is expected. In the present sample, the external crystallites dominate the optical properties of the SSPR $Fe^{3+}$ resin which contains particles of approximately the same size, shape and composition as the large-bead $Fe^{2+}$ material which it resembles.

The magnetic saturation moment of the sample after the first loading was 7.2 emu/g. The magnetic saturation moments of these materials is usually less than that expected from the iron content of the resin, assuming complete conversion to the gamma form due to small-particle magnetic effects. In the present case the very small internal crystallites may add to or subtract from the moment of the resin depending on the distribution of surface spins.

The magnetic hysteresis curve for the sample is similar to those obtained for the large-bead $Fe^{2+}$ materials containing $(\gamma)$—$Fe_2O_3$ crystallites in the 250 Å range. A net coercive force of 81 Oe is observed and is consistent with the size of the external crystallites. The magnetic remanence of the sample was 10 Maxwells. Clearly, in the present sample, the external crystallites dominate the magnetic and optical properties of the SSPR $Fe^{3+}$ resin. Controlling the distribution of single-domain to multidomain particles allows fine-tuning of the magnetic properties of the resin. Thus, a material having a net coercive force and a high initial permeability due to the superparamagnetic contribution of the single-domain particles is possible.

Example 14

Figure 7:
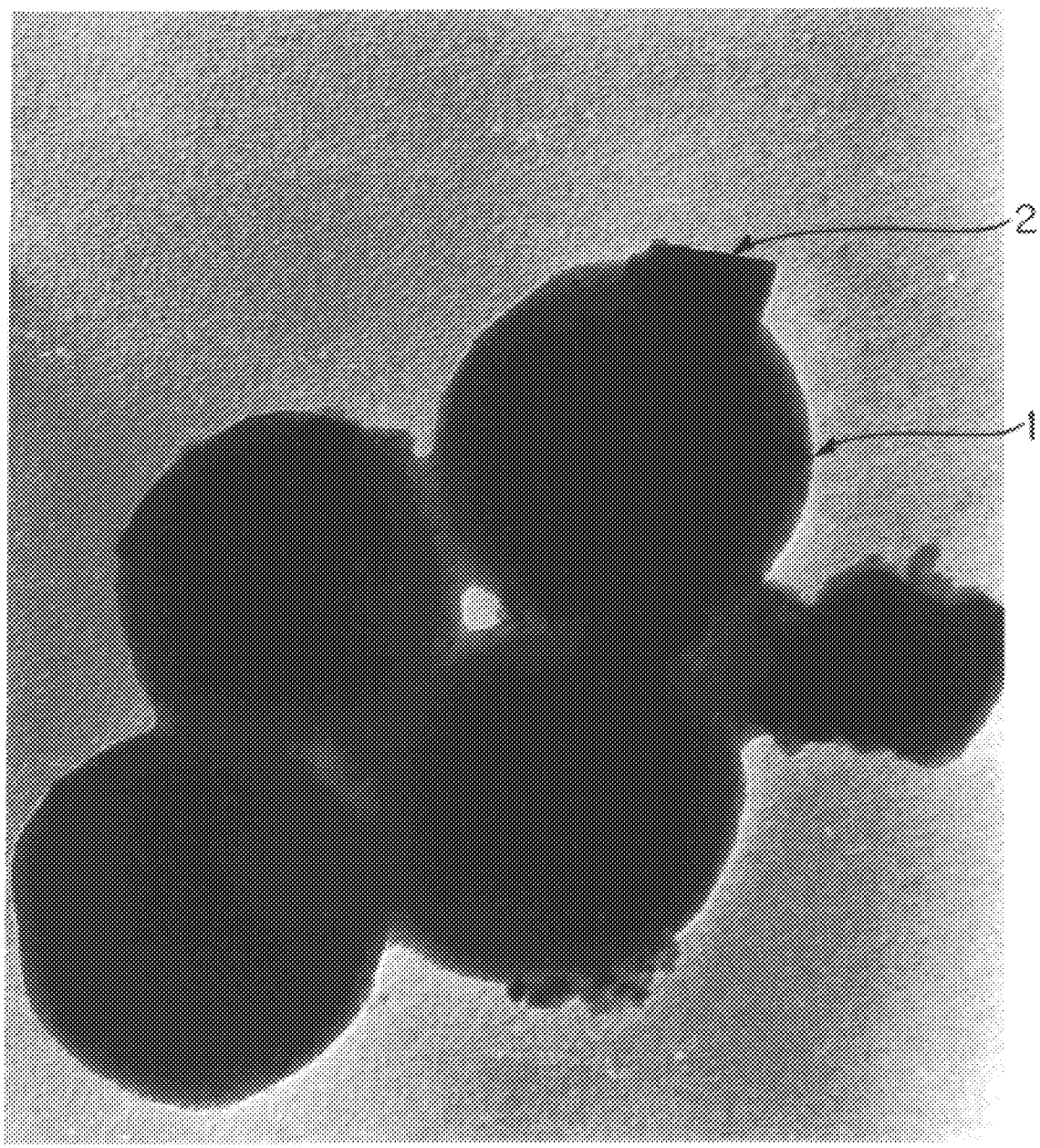
FIG. 7 is a transmission electron micrograph of the SSPR $Fe^{3+}$ resin. Magnification: 660 KX; 1 cm=150 A

An ink composition comprising 2.5 percent by weight of the magnetic material produced in Example 1, 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), and 81.5 percent by weight of toluene was prepared by mixing together the ingredients at room temperature, 25° C., stirring to obtain a homogeneous solution, and filtering. The ink thus prepared can be incorporated into a thermal ink jet test fixture. It is believed that images of excellent resolution with no substantial background deposits can be obtained. The images thus produced are magnetic and may be colored by incorporating dyes or pigments as described in the above specification and FIG. 7.

Two additional inks can be prepared, said inks being of the same composition as above, except that one contained 0.1 percent by weight of CARBOWAX M20™ (a polyethylene oxide/bisphenol-A polymer with a molecular weight of 18,000 (obtained from Union Carbide Corporation, Danbury, Conn.)), and 2.4 percent by weight of the fullerene, and the second ink contained 0.3 percent by weight of CARBOWAX M20™ and 2.2 percent by weight of the fullerene. The CARBOWAX M20™ is added to the ink at room temperature and the resulting mixture is stirred for about 5 minutes to obtain a homogeneous solution.

Example 15

An ink composition comprising 2.5 percent by weight of the magnetic material of Example 1, 15 percent by weight of ethylene glycol, 0.3 percent by weight of CARBOWAX M20™$^{3W}$, and 82.2 percent by weight of water was prepared by mixing together the ingredients at room temperature, stirring for about 10 minutes to obtain a homogeneous solution, and filtering. The ink thus prepared was incorporated into a jetting test fixture. It is believed that images of excellent resolution with no substantial background deposits can be obtained. The images thus produced are magnetic and may be colored by incorporating dyes or pigments as described in the above specification and FIG. 7.

Other embodiments of the invention will be apparent to those skilled in the art from consideration of the specification and practice of the invention disclosed herein. It is intended that the specification and examples be considered exemplary only, with a true scope and spirit of the invention being indicated by the following claims.

We claim:

1. A liquid toner composition comprising:

magnetic particles in a stable colloid dispersion in a compatible vehicle or carrier comprising an aqueous medium, wherein said magnetic particles are loaded into an ion exchange resin; and wherein the colloid dispersion contains a fluidized matrix of said ion exchange resin, said matrix having been fluidized by micronization of said loaded ion exchange resin.

2. An ink jet ink composition comprising:

magnetic particles in a stable colloid dispersion in a compatible vehicle or carrier comprising an aqueous medium, wherein said magnetic particles are loaded into an ion exchange resin; and wherein the colloid dispersion contains a fluidized matrix of said ion exchange resin, said matrix having been fluidized by micronization of said loaded ion exchange resin.

* * * * *